US012687522B2

(12) United States Patent
Zhang et al.

(10) Patent No.: US 12,687,522 B2
(45) Date of Patent: Jul. 21, 2026

(54) PREPARATION METHOD OF SIMULATED SPECIMEN FOR NON-DESTRUCTIVE TESTING OF METAL MATERIALS

(71) Applicant: CHINA NIL RESEARCH CENTER FOR PROFICIENCY TESTING, Beijing (CN)

(72) Inventors: Liang Zhang, Beijing (CN); Haizhou Wang, Beijing (CN); Lingtian Tang, Beijing (CN); Yongyan Chen, Beijing (CN)

(73) Assignee: CHINA NIL RESEARCH CENTER FOR PROFICIENCY TESTING, Beijing (CN)

( * ) Notice: Subject to any disclaimer, the term of this patent is extended or adjusted under 35 U.S.C. 154(b) by 281 days.

(21) Appl. No.: 18/374,628

(22) Filed: Sep. 28, 2023

(65) Prior Publication Data

US 2024/0345035 A1     Oct. 17, 2024

(30) Foreign Application Priority Data

Apr. 11, 2023    (CN) .......................... 202310380384.3

(51) Int. Cl.
| | |
|---|---|
| *G01N 29/26* | (2006.01) |
| *G01N 1/28* | (2006.01) |
| *G01N 23/046* | (2018.01) |

(52) U.S. Cl.
CPC .............. *G01N 29/26* (2013.01); *G01N 1/28* (2013.01); *G01N 23/046* (2013.01); *G01N 2291/265* (2013.01)

(58) Field of Classification Search
None
See application file for complete search history.

(56) References Cited

U.S. PATENT DOCUMENTS

| | | | |
|---|---|---|---|
| 2023/0150028 A1* | 5/2023 | Li .......................... | B22F 10/366 378/207 |
| 2023/0194445 A1* | 6/2023 | Zavalij ................. | G01N 23/207 378/73 |

* cited by examiner

*Primary Examiner* — Suman K Nath
(74) *Attorney, Agent, or Firm* — Maschoff Brennan

(57) ABSTRACT

The invention relates to a method for preparing simulated samples for non-destructive testing of metal materials, which can carry out reverse batch copying of cavity-type defect samples, specifically: obtaining metal samples with natural and real cavity-type defects; using high-resolution X-ray industrial CT scans the sample to obtain relevant information about cavity defects in the sample; using 3D laser printing method to batch prepare new samples with combined defect characteristics that meet defect consistency; using high-resolution X-ray industrial CT to obtain the cavity defects prepared by printing are reviewed, inspected, and evaluated with the original cavity defects to verify that the printed samples meet the requirements of cavity defect consistency; save cavity defect information, scanning parameters, powder composition and printing process parameters. The method of the invention can accurately obtain defect information, can meet various non-destructive testing requirements, can be replaced with each other, and the examination and evaluation processes can be parallelized, thereby improving the efficiency.

10 Claims, 7 Drawing Sheets

PREPARATION METHOD OF SIMULATED SPECIMEN FOR NON-DESTRUCTIVE TESTING OF METAL MATERIALS

TECHNICAL FIELD

The invention relates to a method for preparing simulated samples for non-destructive testing of metal materials.

Non-destructive testing defect samples can be used as reference samples, quality control samples, proficiency testing field samples, non-destructive testing personnel training practical samples, typical failure mode samples, etc. Defect samples that have been subjected to defect valuation and characterization can be used in the training and assessment of inspection and testing personnel, the testing comparison reference of testing laboratories, and the assessment of testing capabilities.

BACKGROUND ART

Cavity defects are one of the most common and important failure forms caused by metal material manufacturing and material service processes. They are an important area of focus for non-destructive testing and failure analysis research.

Cavity defects include crack defects, hole defects, etc., and their generation methods include various stress defects (temperature stress), metallurgical defects, welding defects, etc.

Cavity defects have three-dimensional morphological characteristics, and their expansion path, number, and location distribution are random. Multiple samples with the same cavity defects cannot be prepared using traditional machining methods. In particular, the same defect size, dimensions, and expansion path or location distribution cannot be guaranteed. Each cavity defect is unique. In reality, cavity defect samples are almost never exactly the same. Traditional artificially manufactured cavity defect samples cannot be directly replaced. In the field of non-destructive testing, when it is necessary to assess and evaluate inspection and testing personnel, and when evaluating the laboratory's testing capabilities, it is necessary to use multiple defective samples that meet consistency requirements or only use the same sample. Such assessment, evaluations are more comparable. If all personnel and equipment use the same defective sample during inspection, inspection can only be carried out in sequence, which cannot improve the parallelism and efficiency of the assessment and evaluation process. How to batch print and prepare defective samples (such as typical crack defect samples) that meet the consistency requirements for the assessment and evaluation of related detection capabilities is a problem that needs to be solved.

Technical Problems

The purpose of the method of the present invention is to solve these problems, which is of very important significance.

Technical Solution

In order to achieve the above objects, the present invention provides the following technical solutions:

First, the present invention provides a method for batch reverse printing and preparation of simulated samples for non-destructive testing of metal materials based on X-ray scanning, which includes five main steps:

1) Obtain metal samples with natural and real cavity defects; 2) Using high-resolution X-ray industrial CT to scan the sample to obtain relevant information about cavity defects in the sample; 3) Using 3D laser printing method to batch prepare new samples with combined defect characteristics that meet the consistency of cavity defects. Traditional processing methods cannot obtain multiple samples with consistent defect characteristics, and the type of cavity defects in a single sample is often relatively single. Typical characteristic defects obtained by scanning are selected and combined to form multi-style and multi-category cavity defects, which can imitate more complex and realistic simulation preparation of various types of defects, and can also improve the complexity of cavity defects of the test sample, which can better inspect and evaluate the user's level; 4) Using high-resolution X-ray industrial CT to obtain the cavity defects produced by printing, and review, inspect, and evaluate them with the original cavity defects. To verify that the sample prepared by printing meets the consistency requirements of cavity defects; 5) Save cavity defect information, scanning parameters, powder composition and printing process parameters. It can be saved to local storage devices, mobile storage devices, network storage devices, etc., and can be easily accessed when you need to use it again, and then print and prepare new samples.

Furthermore, in the method for preparing a simulated sample for non-destructive testing of metal materials of the present invention, the cavity defects in the metal sample can be caused by various reasons, including but not limited to crack defects, hole defects, loose defects, etc. The cavity defects are located inside the metal sample, or the cavity defects are located at the outer edge of the metal sample.

Further, in the method for preparing a simulated sample for non-destructive testing of metal materials of the present invention, the information related to sample cavity defects obtained during scanning in step 2) includes but is not limited to three-dimensional shape, size, and spatial distribution, which can be used to extract and/or three-dimensional reconstruction of defects.

Further, in the method for preparing a simulated sample for non-destructive testing of metal materials of the present invention, in the new sample prepared by printing in step 3), the consistent combined defects of the cavity-like defects are part or all of the cavity type defect in a metal sample; or, in the new sample printed and prepared in step 3), the consistent combination of cavity defects is the combination of different cavity defects selected from multiple metal samples.

Furthermore, in the method for preparing a simulated sample for non-destructive testing of metal materials of the present invention, the three-dimensional laser printing method described in step 3) uses a model obtained by processing the sample defect information obtained by industrial CT scanning. Use the information of metal powder raw materials to set the corresponding printing process parameters, and powder information, such as laser power, scanning rate, spot size, laser spot offset, positioning accuracy, powder spreading process, powder particle size and composition, etc., and print the prepared single or multiple new specimens with cavity defects;

The printing process parameters include laser power, scanning rate, spot size, laser spot offset, and positioning accuracy. The metal material information includes powder spreading process, powder particle size, and metal material composition.

Further, in the method for preparing simulated samples for non-destructive testing of metal materials of the present invention, the method of reviewing, inspecting and evaluating the printed defective samples described in step 4) specifically includes:

First, use industrial CT to scan the cavity defect information of the original sample and the printed sample prepared in step 3), and obtain the respective cavity defect data models after processing;

Then, in professional CT analysis software such as VG Studio MAX on the computer, a three-dimensional fitting and comparative analysis of the two cavity defects was carried out, and quantitative comparisons were made from the model shape, wall thickness and deviation distribution, and the verification test was carried out. Verify whether the sample cavity defects meet the consistency requirements. Those that meet the consistency requirements are used in the same group as the original metal samples, and those that do not meet the consistency requirements are eliminated or used as new metal samples.

Further, in the method for preparing simulated samples for non-destructive testing of metal materials of the present invention, the saving step described in step 5) is to store in a local storage device, a mobile storage device or a network storage device. When it needs to be used again after the initial operation, it can be easily retrieved, prepared for printing, and used repeatedly.

In a second aspect, the present invention also protects a metal material non-destructive testing simulation sample prepared by using the above-mentioned method for preparing a metal material non-destructive testing simulation sample.

In the third aspect, the present invention also protects the application of non-destructive testing simulation samples of metal materials prepared by the above method, which can be used as reference samples, quality control samples, samples in the field of proficiency testing, non-destructive testing personnel training practical samples, and typical failure mode samples.

In the fourth aspect, the present invention also protects the application of non-destructive testing simulation samples of metal materials prepared by the above method. The samples have been subjected to defect determination and qualitative analysis, and are used for training and assessment of inspection and testing personnel, or for testing comparison reference and testing capability assessment of testing laboratories.

The method of the present invention uses metal material samples with cavity defects as reverse batch printing preparation objects, and uses high-resolution X-ray industrial CT to test single or multiple samples with real cavity defects that can be penetrated by rays. The sample is subjected to tomography scanning. This type of real cavity defect sample is not affected by the material, structure and surface state of the test sample. Through tomography, the layer-by-layer distribution of cavity defects on the surface of the sample and inside the sample can be obtained. The geometric structure, density distribution and other information of the sample are reconstructed into a three-dimensional image of the sample and the cavity defects inside the sample from multiple tomography images, which more intuitively presents the size, location, direction of the cavity defects. During the scanning process, the threshold value of the CT image can be set, and the edge of the defect can be detected based on the difference in gray level of the image, thereby obtaining defect information more accurately.

After obtaining the three-dimensional image of the sample defects, 3D laser printing technology can be used to batch print and prepare samples with similar defect characteristics. The shape of the new samples prepared by printing is not affected by the shape of the original sample. High-resolution X-ray industrial CT scan the new sample to obtain information about cavity defects, compare it with the defects of the original sample. It can meet the needs of all kinds of non-destructive testing and can be replaced with each other, so that the assessment and evaluation process can be parallel, which greatly improves the efficiency.

Figure 1:
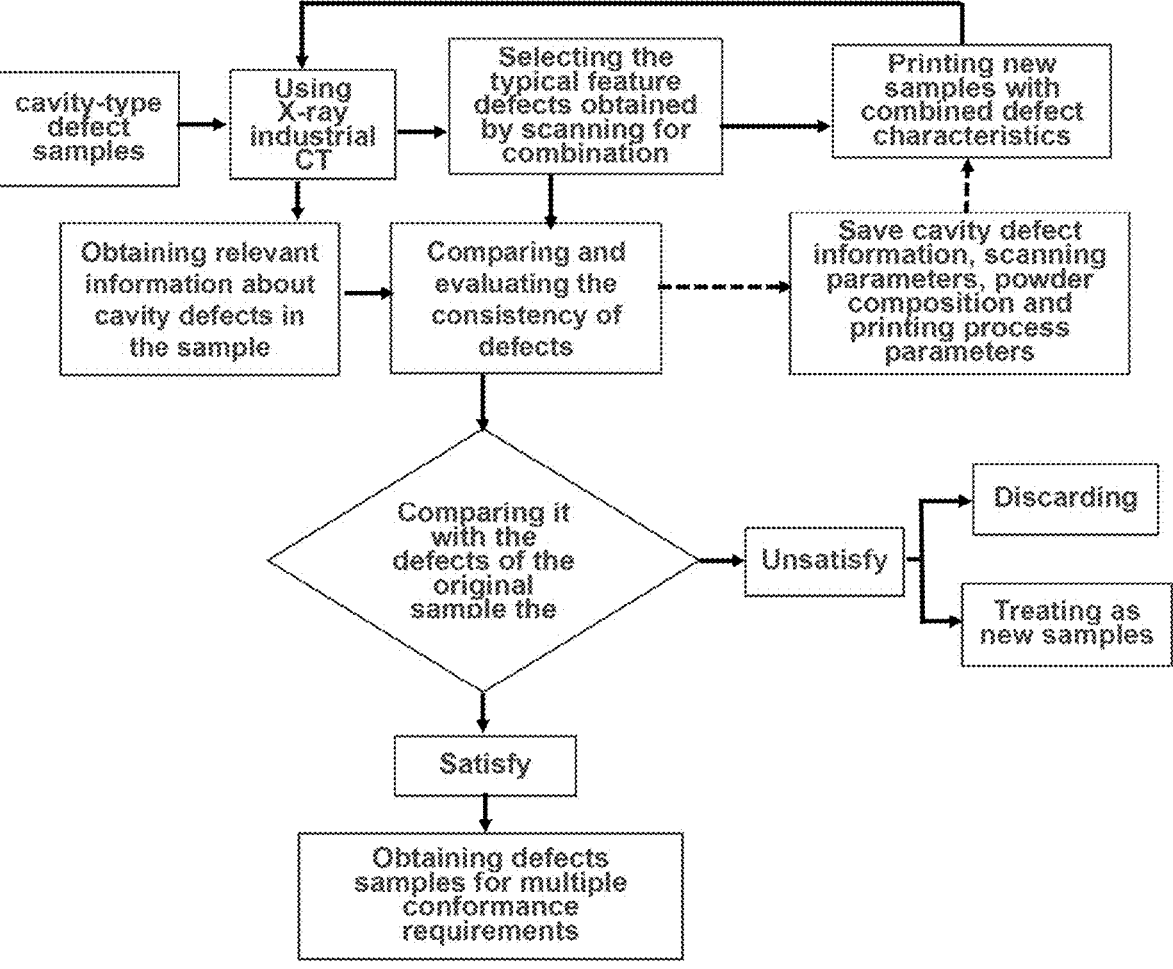
FIG. 1 is a flow chart of the sample preparation method of the present invention.
Figure 2:
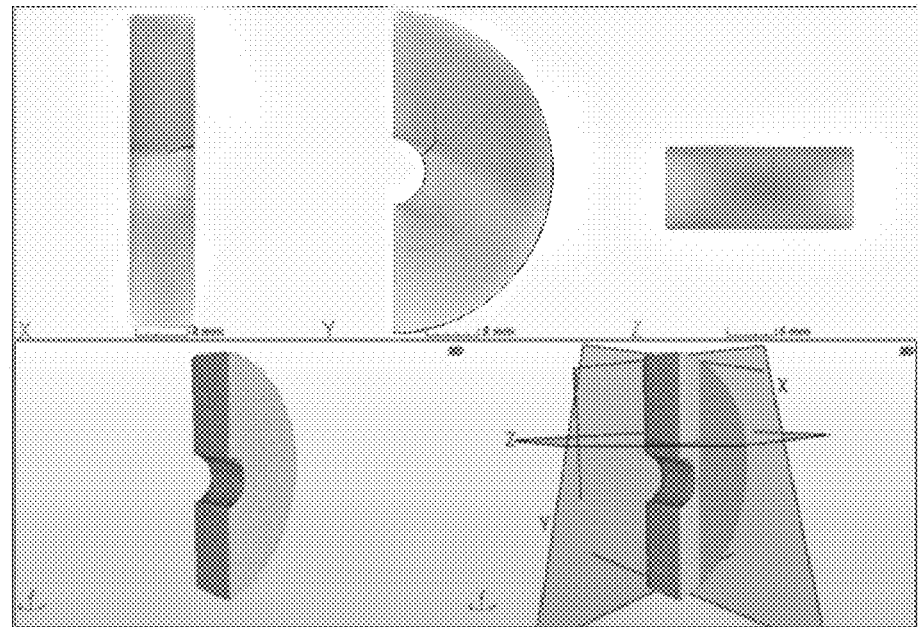

The upper part of FIG. 2 is an industrial CT cross-section view of a semicircular ring crack defect sample according to the method embodiment of the present invention; the lower part is a three-dimensional image obtained by scanning the semicircular ring crack defect sample layer by layer.

Figure 3:
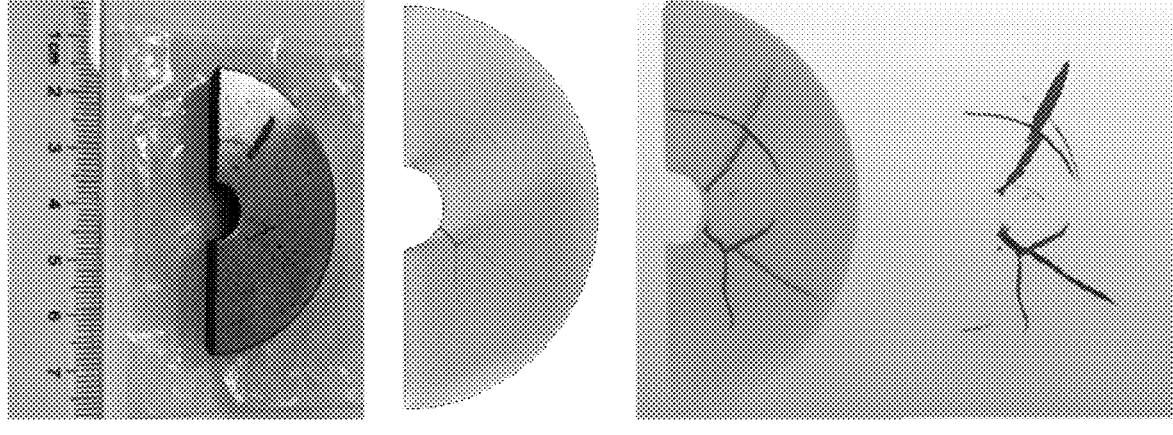

FIG. 3 shows, from left to right, the semi-circular ring sample, the industrial CT section of the sample, the reconstructed three-dimensional image of the sample and the extracted three-dimensional defect image according to the embodiment of the present invention.

Figure 4:
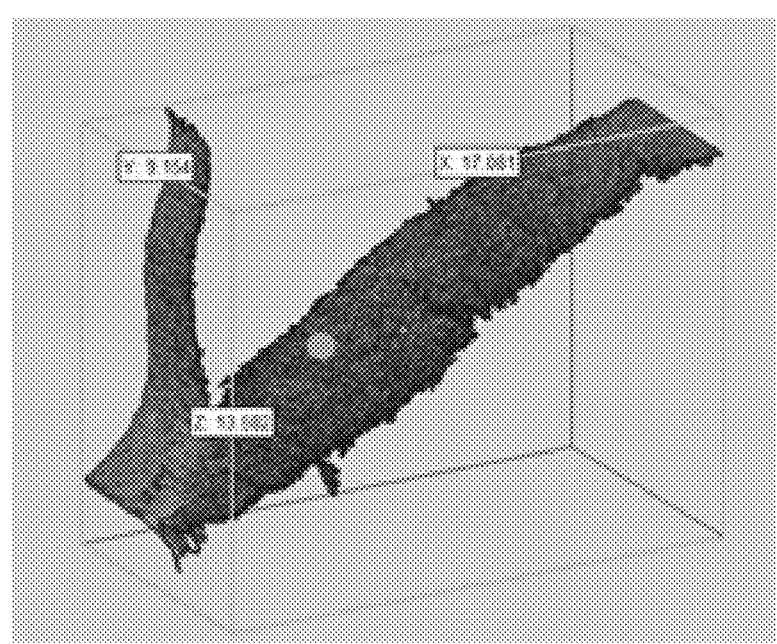

FIG. 4 is a preview of a three-dimensional model file of a crack defect (crack in the dotted line frame of FIG. 3) extracted from the semi-circular ring sample for printing preparation during the embodiment of the method of the present invention.

Figure 5:
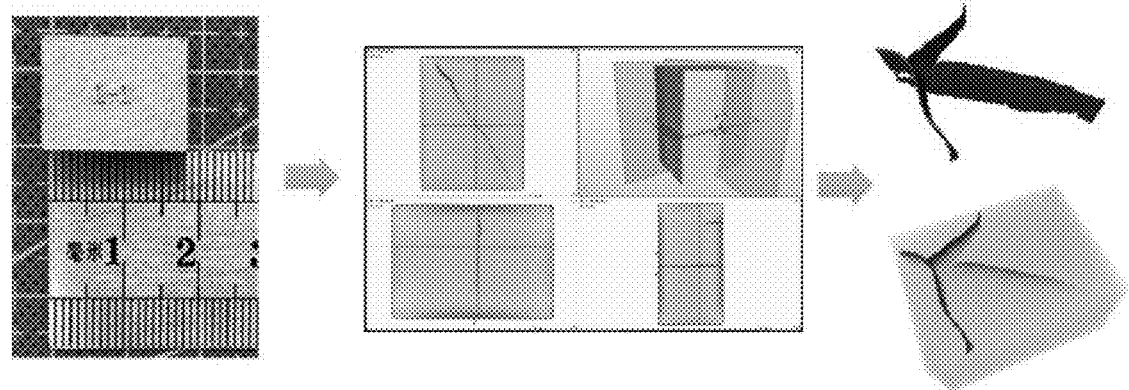

FIG. 5 shows, from left to right, a rectangular sample (the sample contains the crack shown in FIG. 4) and a rectangular sample prepared by printing using the crack three-dimensional model file of FIG. 4 according to the method embodiment of the present invention. Scanned cross-sections, three-dimensional reconstructed three-dimensional images of the specimen, and three-dimensional crack images extracted from the rectangular specimen.

Figure 6:
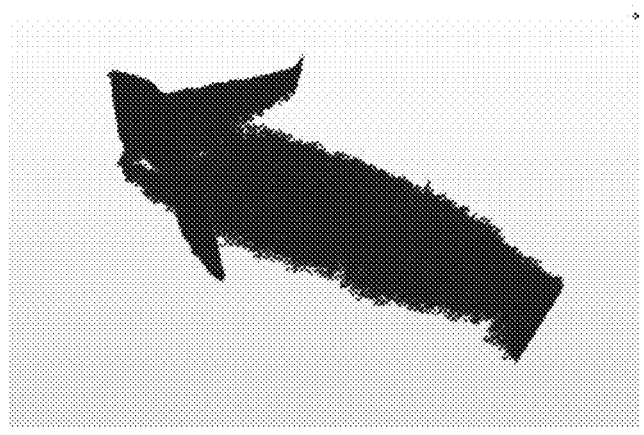

FIG. 6 is a three-dimensional model of a defect on the semi-circular ring sample according to the method embodiment of the present invention, and FIG. 4 is a view of the same crack three-dimensional model from different perspectives.

Figure 7:
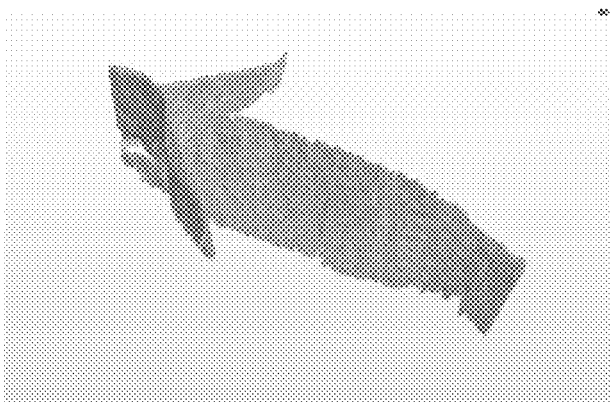

FIG. 7 shows the three-dimensional crack model extracted from the printed rectangular sample in FIG. 5.

Figure 8:
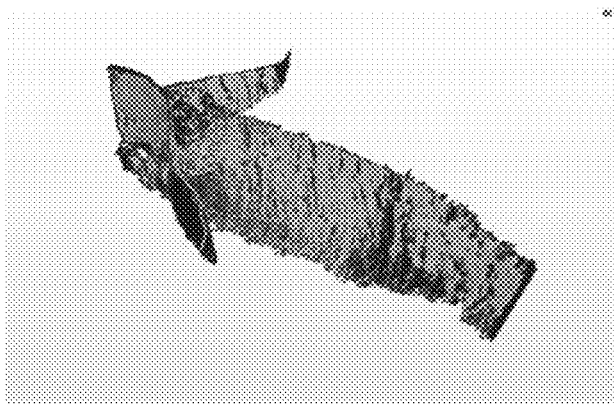

FIG. 8 is a comparison of the three-dimensional model fitting and overlapping effects of FIG. 6 (real, original cracks) and FIG. 7 (crack defects in printed prepared samples) in the method embodiment of the present invention.

Figure 9:
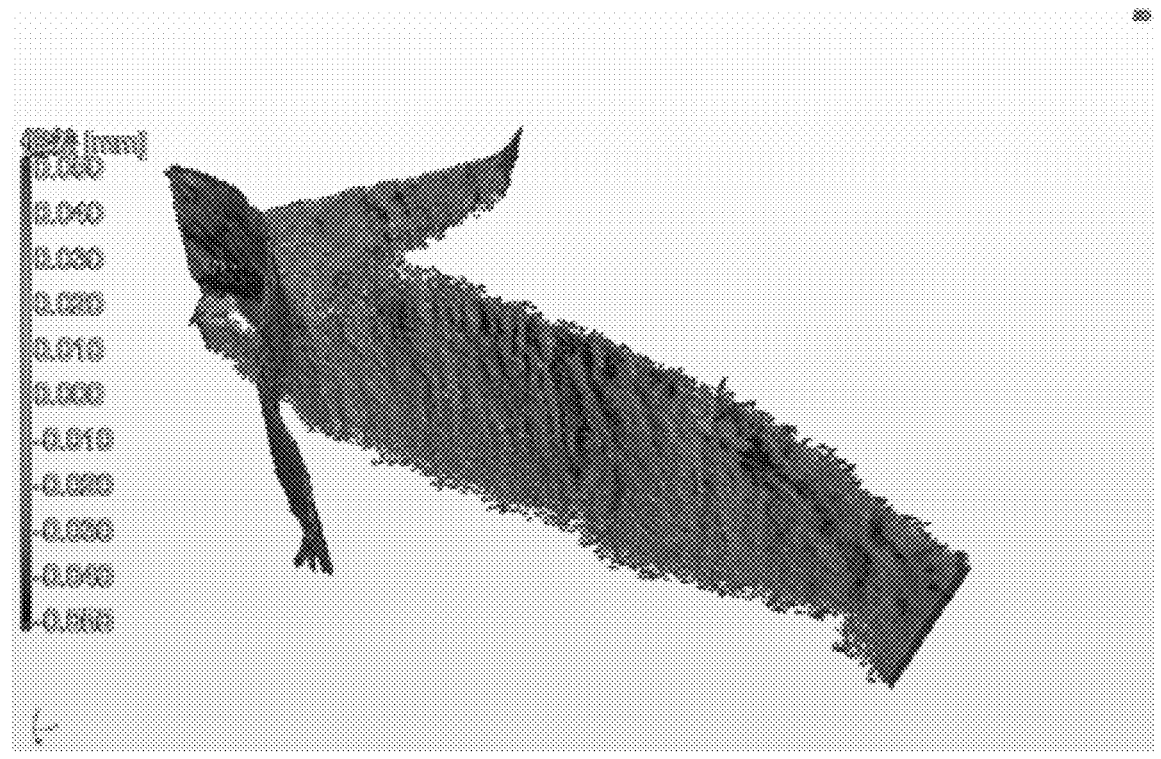

FIG. 9 is a deviation analysis diagram of the overlapping three-dimensional comparison model fitted in FIG. 8.

PREFERRED EMBODIMENTS OF THE INVENTION

The method of the present invention is a batch reverse printing preparation method of cavity defect samples for non-destructive testing using X-ray industrial CT scanning. The representative specific embodiments and processes of the present invention are clearly and completely described below in conjunction with the accompanying drawings:

This embodiment takes a single crack defect sample as an example. The specific steps are as follows:

1) This example is a sample with crack defects. The shape of the sample is a semicircular ring, the size is $\varphi$100 mm in the outer circle, φ10 mm in the inner circle, and 20 mm in thickness. The material and thickness of the sample meet the requirements of X-ray industrial CT scanning imaging. Use alcohol, gasoline, etc. to clean off the oil stains, put the sample into acid to corrode the cracks for a certain time, such as 10 minutes, take out the sample, clean it with absolute alcohol and dry it.

2) Use high-resolution X-ray industrial CT to scan the semi-circular crack defect sample to obtain information about cavity defects inside the sample. Set industrial CT parameters, scan and generate a three-dimensional data model of the defect morphology.

a) Place the sample into an X-ray industrial CT. If using a high-resolution X-ray industrial CT (with a 300 kV micro-focus source, the spatial resolution is up to 2 μm), adjust the equipment parameters and find the optimal resolution parameters. Save the parameters and scan the sample to obtain information such as the sample and defect morphology and size. For example, the process parameters adopted this time are: tube voltage 150 kV~300 kV, tube current 0.05 μA~1 μA, and scanning time 1 h~2 h.

b) During the scanning process, the sample is rotated 360° relative to the X-ray source and detector, and images are collected every 0.25°. Each DR image is synthesized from 2 to 3 frames of DR images with an integration time of 0.6 s. The detector collect thousands of X-ray DR images after the conical X-ray beam penetrates the sample to form a three-dimensional crack image. First, use tool software to extract the three-dimensional image (extract the crack information from the background), and then model the three-dimensional crack data, generate a real crack three-dimensional model.

During the process, the equipment threshold and so on can be adjusted as needed to meet the crack resolution when reconstructing the three-dimensional model. Once the relevant parameter values are determined, they will not change. The same parameter values will be used in subsequent scans, reconstructed three-dimensional models, and retested printed samples.

3) Use the three-dimensional laser printing method to batch prepare new samples with combined defect characteristics that meet defect consistency; traditional processing methods cannot obtain multiple samples with defect characteristics that meet the consistency requirements, and the type of cavity defects in a single sample is usually relatively simple. Select the typical characteristic defects obtained by scanning and combine them to form multiple styles and categories of cavity defects. It can simulate the preparation of more complex and realistic types of defects, and can also improve the complexity of cavity defects of the sample to be tested, and better inspect and evaluate the user's level.

This embodiment does not combine defects. Depending on the implementation, typical characteristic defects such as strips and round holes can be selected as combinations to simulate the characteristics of more complex cracks and holes as real defects.

4) Select the powder composition, particle size, set appropriate printing and process parameters, and print a new sample of the defect morphology data model.

a) This example uses a 200 W fiber laser and uses special powder spreading technology to ensure the smoothness of the powder spreading. The corresponding experimental parameters are spot size 20-25 μm, positioning accuracy 1 μm, laser offset 0.03 mm, and powder particle size <20 μm, forming size φ100*150, and the focused spot size ensures the printing accuracy of micron-level 3D printing. Using pulsed laser, the laser point can be precisely controlled during the printing process, thereby achieving support-free printing of complex structures.

The composition of the stainless steel powder used in this example is as follows:

TABLE

| 316L stainless steel powder | | | | | | | | | |
|---|---|---|---|---|---|---|---|---|---|
| C, % | Cr, % | Mo, % | S, % | Ni, % | Si, % | Mn, % | P, % | O, % | Fe, % |
| 0.02 | 16.50 | 2.12 | 0.01 | 10.40 | 0.22 | 0.69 | 0.03 | 0.012 | surplus | b) Use high-resolution X-ray industrial CT to obtain the cavity defects prepared by printing, and review, inspect, and evaluate the original cavity defects to verify that the printed sample meets the requirements for consistency of cavity defects.

By CT scanning the crack defect sample prepared by printing, the simulated crack information inside the sample is obtained and the three-dimensional model is reconstructed. The tool software VG Studio is also used for three-dimensional image extraction.

The scanned model of the printed crack defect and the scanned model of the real crack defect are merged in different colors, and a three-dimensional scale fitting and comparative analysis is performed in the tool software VG Studio to quantify the model shape, wall thickness, and deviation distribution. Compare the crack defects prepared by printing with the original crack defects to verify the consistency of the crack defects prepared by printing and the crack defects of the real defect sample.

According to the method in FIG. 9, data statistics are made on the three-dimensional deviation distribution of the simulated cracks. This implementation for example, taking the deviation corresponding to 50% of the surface area as a reference, the preparation deviation corresponding to the crack data is 0.013 mm.

Verify that the crack defect samples prepared by batch reverse printing have the same or similar defects. Verify that the samples with the same or similar defects can be used as non-destructive testing samples of the same level, as reference samples, quality control sample, capability verification field sample, non-destructive testing personnel training practical sample, typical failure form sample, etc., otherwise they will be treated as new samples or discarded. Multiple defective samples that meet the consistency requirements cannot be obtained by traditional processing methods.

5) Cavity defect information, scanning parameters, powder composition and printing process parameters can be saved to local storage devices, mobile storage devices, network storage devices, etc. When needed to be used again, they can be easily retrieved and then printed to prepare new samples.

The invention claimed is:

1. A preparation method of simulated specimens for non-destructive testing of metal materials includes five main steps:

1) obtain metal samples with natural and real cavity defects; 2) high-resolution X-ray industrial CT was used to scan the sample to obtain the relevant information of cavity defects of the sample; 3) using 3D laser printing method to batch prepare new samples with combined defect characteristics that meet the consistency of cavity defects; 4) high-resolution X-ray industrial CT is used to obtain the printed cavity defects, and the original cavity defects are reviewed, inspected and evaluated to verify that the printed samples meet the consistency requirements of cavity defects; 5) save cavity defect information, scanning parameters, powder composition and printing process parameters.

2. The method for preparing simulated samples for non-destructive testing of metal materials according to claim 1, characterized in that, in the new sample prepared by printing in step 3), the combined defect of the cavity type defect consistency is part or all of the cavity type defect in a metal sample;

or, in the new sample printed and prepared in step 3), the consistent combination of cavity defects is a combination of different cavity defects selected from multiple metal samples.

3. The method for preparing simulated samples for non-destructive testing of metal materials according to claim 1, characterized in that the cavity defects of the metal sample include but are not limited to crack defects, hole defects, and loose defects, and the cavity defects are located inside the metal sample, or the cavity defects are located at the outer edge of the metal samples.

4. The method for preparing simulated samples for non-destructive testing of metal materials according to claim 1, characterized in that the information related to sample cavity defects obtained during scanning in step 2) includes but is not limited to three-dimensional shape, size, space distributed.

5. The method for preparing simulated samples for non-destructive testing of metal materials according to claim 1, characterized in that:

the 3D laser printing method described in step 3) uses the sample defect information obtained by industrial CT scanning to obtain a model, sets the corresponding printing process parameters according to the information of the metal powder raw materials used, and prints and prepares one or more new samples with cavity defects;

the printing process parameters include laser power, scanning rate, spot size, laser spot offset, and positioning accuracy; the metal material information includes powder spreading process, powder particle size, and metal material composition.

6. The method for preparing simulated samples for non-destructive testing of metal materials according to claim 1, characterized in that the method of reviewing, inspecting and evaluating the defective samples prepared by printing in step 4) specifically includes:

first, use industrial CT to scan the cavity defect information of the original sample and the printed sample prepared in step 3), and obtain the respective cavity defect data models after processing; then, a three-dimensional fitting and comparative analysis of the two cavity defects was carried out in the professional computer CT analysis software; from the aspects of model shape, wall thickness and deviation distribution, the comparison was carried out in a quantitative way to verify whether the cavity defects of the samples met the consistency requirements; those that meet the consistency requirements are used in the same group as the original metal samples, and those that do not meet the consistency requirements are eliminated or used as new metal samples.

7. The method for preparing simulated samples for non-destructive testing of metal materials according to claim 1, characterized in that the step of saving in step 5) is to store in a local storage device, a mobile storage device or a network storage device.

8. A metal material non-destructive testing simulation sample is prepared using the preparation method described in claim 1.

9. The application of the metal material non-destructive testing defect sample described in claim 8 is used as a reference sample, quality control sample, proficiency testing field sample, non-destructive testing personnel training practical sample, and typical failure mode sample.

10. The application of the metal material non-destructive testing defect sample according to claim 8, the sample has been subjected to defect determination and qualitative analysis, and is used for training and assessment of inspection and testing personnel, or for testing laboratory comparison reference, testing capability assessment.

* * * * *